United States Patent
Gans et al.

[11] Patent Number: 5,996,639
[45] Date of Patent: Dec. 7, 1999

[54] MULTIPLE COMPARTMENT CORRUGATED HOSE

[75] Inventors: Leo Gans, Teaneck; Ronald Presinzano, Andover, both of N.J.

[73] Assignee: Action Technology, Rockaway, N.J.

[21] Appl. No.: 08/790,423

[22] Filed: Jan. 30, 1997

[51] Int. Cl.[6] .................................. F16L 11/11; B31F 1/12
[52] U.S. Cl. ...................... 138/115; 138/121; 264/514; 264/282; 264/286; 264/289.6
[58] Field of Search ..................................... 138/115, 121, 138/116, 117; 264/514, 166, 282, 286, 289.6

[56] References Cited

U.S. PATENT DOCUMENTS

| | | |
|---|---|---|
| 2,622,623 | 12/1952 | Michaudet . |
| 2,728,356 | 12/1955 | Brinsmade et al. . |
| 2,823,702 | 2/1958 | November . |
| 3,028,289 | 4/1962 | Roberts et al. ........................ 138/121 |
| 3,110,753 | 11/1963 | Witort ..................................... 138/116 |
| 3,234,969 | 2/1966 | Du Mont . |
| 3,280,430 | 10/1966 | Antrobus . |
| 3,286,305 | 11/1966 | Seckel . |
| 3,313,319 | 4/1967 | Osborn et al. . |
| 3,540,489 | 11/1970 | Hanson . |
| 3,571,486 | 3/1971 | Kennedy . |
| 3,572,393 | 3/1971 | Eisert . |
| 3,605,817 | 9/1971 | Bauman et al. . |
| 3,660,000 | 5/1972 | Yoshida et al. . |
| 3,784,785 | 1/1974 | Noland . |
| 3,794,080 | 2/1974 | Huston et al. . |
| 3,818,116 | 6/1974 | Kuljian . |
| 3,971,416 | 7/1976 | Johnson . |
| 3,992,565 | 11/1976 | Gatfield . |
| 4,034,499 | 7/1977 | Wild . |
| 4,064,355 | 12/1977 | Neroni et al. . |
| 4,096,887 | 6/1978 | Streit . |
| 4,120,347 | 10/1978 | Molnar ..................................... 138/116 |
| 4,132,576 | 1/1979 | Neroni et al. . |
| 4,138,457 | 2/1979 | Rudd et al. . |
| 4,310,259 | 1/1982 | Ito et al. ................................. 138/115 |
| 4,314,717 | 2/1982 | Bjurman . |
| 4,368,348 | 1/1983 | Eichelberger et al. . |
| 4,377,545 | 3/1983 | Hornbeck ............................... 138/121 |
| 4,534,923 | 8/1985 | Lupke ..................................... 138/121 |
| 4,654,962 | 4/1987 | Ben-Dov ................................. 138/115 |
| 4,745,238 | 5/1988 | Kotthaus et al. . |
| 4,795,439 | 1/1989 | Guest . |
| 4,906,496 | 3/1990 | Hosono et al. . |
| 4,930,544 | 6/1990 | Ziu . |
| 4,975,055 | 12/1990 | LaPlante . |
| 5,049,224 | 9/1991 | Umezawa et al. . |
| 5,121,746 | 6/1992 | Sikora . |
| 5,135,265 | 8/1992 | Bouscher et al. . |
| 5,135,702 | 8/1992 | Eales . |
| 5,135,823 | 8/1992 | Eales . |
| 5,236,016 | 8/1993 | Vogelsang . |
| 5,240,788 | 8/1993 | Eales . |
| 5,285,008 | 2/1994 | Sas-Jaworsky et al. . |
| 5,305,797 | 4/1994 | Roy, Sr. . |
| 5,360,291 | 11/1994 | Shimizu . |
| 5,405,569 | 4/1995 | Lupke ..................................... 265/504 |
| 5,447,110 | 9/1995 | Brown . |
| 5,450,703 | 9/1995 | Fuhrman et al. . |
| 5,467,826 | 11/1995 | Miller . |
| 5,493,816 | 2/1996 | Willemsen . |
| 5,501,840 | 3/1996 | Mantovani et al. . |

OTHER PUBLICATIONS

"Corma Inc., Leader in Corrugated Plastic Pipe Production Systems" Brochure, Mar. 1982.

*Primary Examiner*—James F. Hook
*Attorney, Agent, or Firm*—Stroock & Stroock & Lavan LLP

[57] ABSTRACT

An apparatus and method of producing a multiple compartment corrugated hose with at least one inner corrugated partition. The corrugation of the inner partition is achieved by maintaining a predetermined ratio between the peripheral wall and the inner partition wall. The hose is produced using either a continuous blow molding with internal pressure and/or vacuum assist process where the inner partition is allowed to shrink and relax into a corrugated pattern. Such an hose is flexible in all directions and available for many applications.

15 Claims, 3 Drawing Sheets

MULTIPLE COMPARTMENT CORRUGATED HOSE

FIELD OF THE INVENTION

This invention relates generally to hose products, and more particularly to corrugated hoses having multiple compartments and their methods of manufacture.

BACKGROUND OF THE INVENTION

Ordinary hoses are quite common and are used in a wide variety of industrial, medical and commercial applications. For certain applications, the walls of the hose may be corrugated to provide greater flexibility and ease of use.

Further, multiple hoses may be required in tandem for certain applications, such as ones where gases or liquids are transferred to and from the same device. The combination of multiple hoses can, in appropriate situations, be conventionally replaced by a single hose providing at least one inner lateral partition that allows for multiple compartments or lumens within the same hose. For instance, one such known multi-compartment hose, described in U.S. Pat. No. 5,121,746 to Sikora, is used in an anaesthetic and respiratory breathing device. The device disclosed by Sikora involves the use of a two-compartment corrugated hose as part of an apparatus that separates the gas inhaled from the gas exhaled.

Many applications, such as the one described in U.S. Pat. No. 5,121,746, require that the multiple compartment or multi-lumen hose be flexible, durable and capable of being manufactured in variable sizes and lengths.

It is also known that corrugated hoses can be manufactured in several ways, such as by the well-known continuous blow molding or vacuum assisted blow molding methods. One such method is described in U.S. Pat. No. 3,286,305 to Seckel, the disclosure of which is incorporated herein by reference.

Although it has been known that inner lateral membranes serving as partitions in multi-compartment tubing may be extruded directly from the die or inserted inside a hose to create the multiple compartments, a drawback associated with prior known inner partitions and their methods of manufacture is the creation of a stiffening "I-beam" effect in the resulting product caused by the presence of the partition. This I-beam effect reduces the overall flexibility of the tube.

Thus, it is an object of the invention to provide a multi-lumen corrugated hose with a corrugated inner partition that is durable as well as flexible in all directions.

SUMMARY OF THE INVENTION

The present invention overcomes such deficiencies in the known art and offers several advantages. In one embodiment, the invention is directed to an apparatus and method for manufacturing a multi-lumen corrugated hose. The method comprises, in one embodiment, initially forming a multi-lumen parison that includes a peripheral section and at least one inner partition. The hot parison is inserted into a corrugated pattern mold where, under positive and/or negative pressure applied throughout the respective lumens, the peripheral surfaces of the lumen form into the corrugated pattern of the mold, while the inner partition remains flat. The parison is partially cooled in the mold, and then removed for further cooling. During this further cooling stage outside the mold, the multi-lumen hose including the central partition stretches in the longitudinal direction. When the stretch is relaxed the previously flat central partition contracts forming a corrugated configuration due to longitudinal shrinkage. The resulting device thus includes a corrugated peripheral wall with at least one inner partition, the inner partition itself having a corrugated profile.

It is believed important that the proper thermoplastic material be selected for manufacturing such devices in this manner, particularly taking into account manufacturing properties as well as ultimate strength and flexibility. Thus, high melt strength thermoplastics such as ultra-low density polyethylene have been selected in one preferred embodiment for their ability to enhance the strength of the partition during the heating and molding operation while being flexible enough to accept a corrugated configuration upon cooling.

These, as well as other objects and advantages of the present invention, will become apparent from the following detailed description and accompanying drawings.

BRIEF DESCRIPTION OF THE DRAWINGS

The present invention will now be described by way of example with reference to the accompanying drawings wherein.

DETAILED DESCRIPTION OF THE INVENTION

Figure 1:
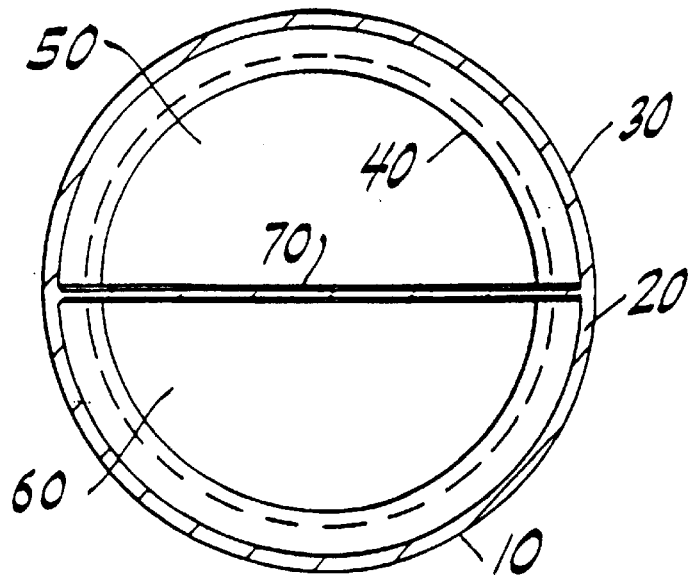
FIG. 1 is a cross-sectional view of a corrugated hose.

FIG. 1 illustrates a cross-sectional view of a corrugated hose 10 according to one preferred embodiment of the present invention. The hose includes a peripheral wall 20, with outer surface 30 and inner surface 40. The hose 10 is separated into two lumens 50 and 60 by inner partition 70.

Figure 2:
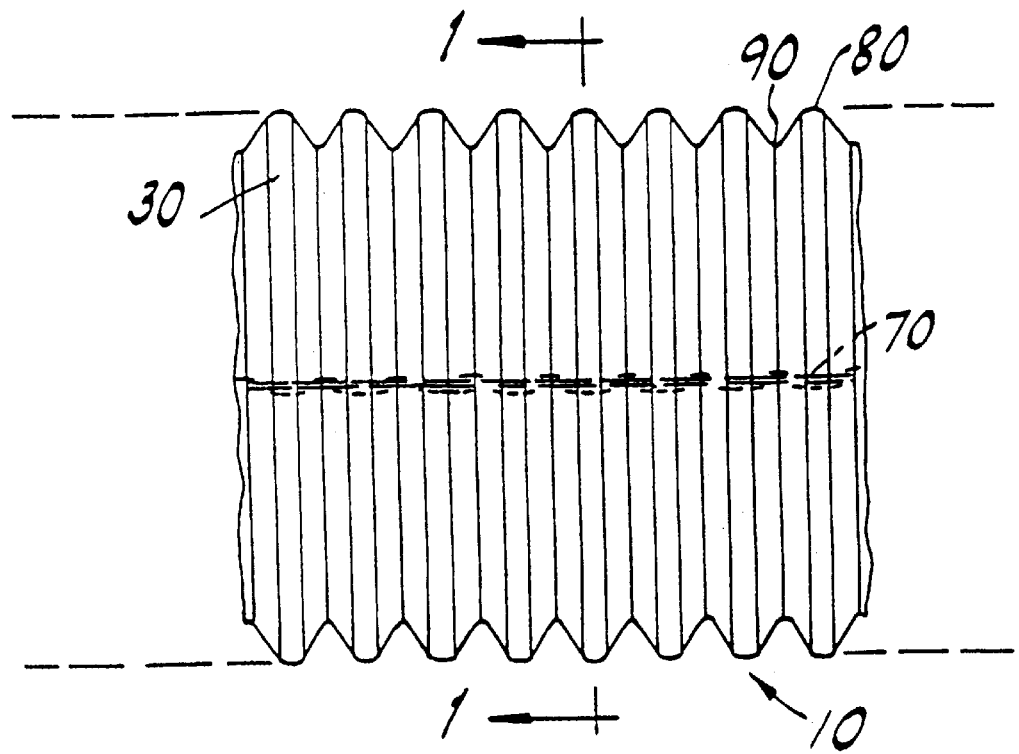
FIG. 2 is a side view of the hose with the inner partition shown by dotted lines.
Figure 3:
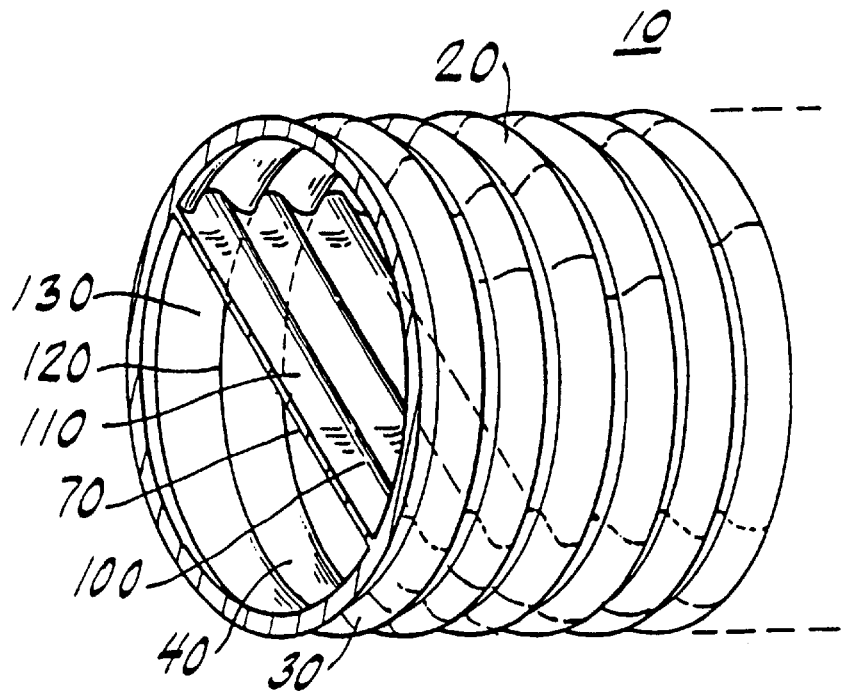
FIG. 3 is a perspective view of the corrugated hose showing its outer and inner corrugations as well as the inner corrugated partition.

The side view of the hose of FIGS. 1 and 3, illustrated in FIG. 2, shows that the outer surface 30 of peripheral wall 20 is formed in a corrugated fashion to have a continuous repeating pattern of ridges and valleys, exemplified by ridge 80 and valley 90.

Referring to FIG. 3, the inner partition 70 is shown to be corrugated, exemplified by ridge 100 and valley 110. FIG. 3 also illustrates the inner surface 40 of peripheral wall 20, including a plurality of ridges and valleys exemplified by ridge 120 and valley 130.

Figure 4:
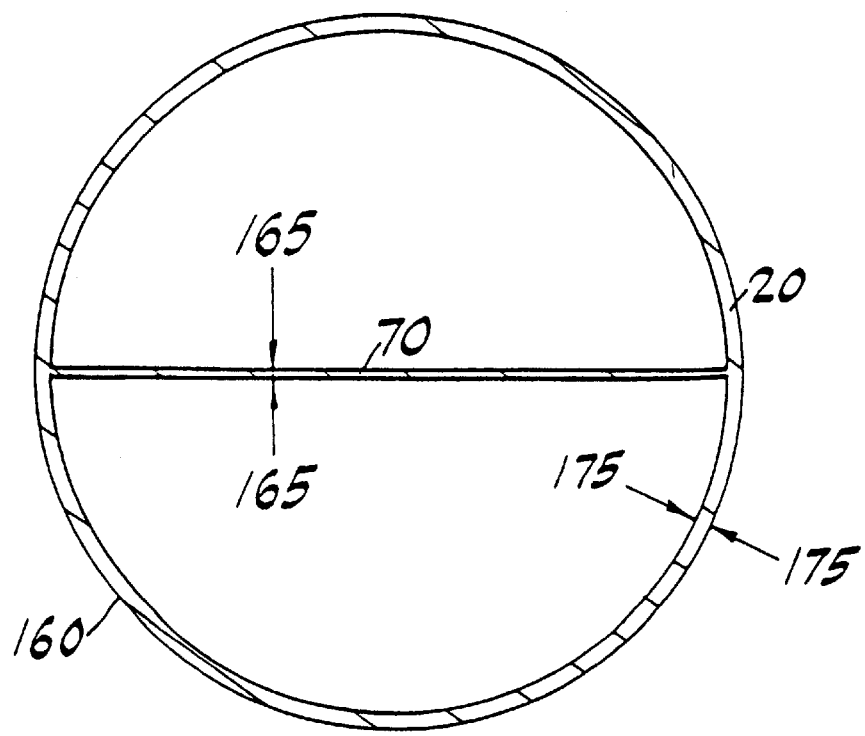
FIG. 4 is a cross-sectional view of an extruded parison.

FIG. 4 illustrates a cross-sectional view of the extruded parison 160, with arrows 165 and 175 highlighting the 2:1 thickness ratio between the outer peripheral wall 20 and the inner partition 70, according to one preferred embodiment of the present invention. As clearly shown in FIG. 4, the outer peripheral wall 20 defines a inner diameter, and the inner partition 70 extends at least half way across the inner diameter.

The precise dimensions of the hose, including the height of the ridges, the depth of the valleys and the pitch of the corrugations, is a matter of design choice and may be, of course, determined by the ultimate application. However, maintaining a 2:1 ratio between the peripheral wall thickness to partition wall thickness of the extruded parison was found to facilitate manufacture of the corrugated hose according to one embodiment of the present invention. The 2:1 ratio used with the extruded parison led to a final, 3:1 ratio between the peripheral wall thickness and partition wall thickness of the corrugated hose. As such, in this embodiment, the thickness of the peripheral wall 20 is determined to be 0.030 inches, and the thickness of inner partition 70 is determined to be 0.015 inches. It will be understood by one of ordinary skill in the art that variations in dimension and this ratio can be made and still be within the scope of the present invention. In any case the partition wall should be thinner than the peripheral wall to accomplish the corrugation process of the partition wall.

The novel method used to produce a corrugated hose with a corrugated inner partition as shown in FIGS. 1–3 involves a number of steps that will now be described.

First, it has now been determined that the selection of the appropriate material to achieve the hose according to the invention is important. In the preferred embodiment, a strong yet highly flexible, high melt strength polyolefin is used. Suitable materials are ultra-low density polyethylene, certain versions of metallocene, or other polyolefin resins or thermoplastics with the right combination of processing and final properties. The melt strength should be sufficient to prevent the hot partition wall as it emerges from the extrusion die from collapsing under the effect of gravity before it has the opportunity to cool and solidify. The reason such selection of material is important include both the properties of the finished product as well as the strength characteristics of the material during the process of manufacturing. By contrast, an EVA copolymer was not selected as a preferred material because it was determined that the use of such material as the inner partition collapsed the partition before the cooling process had been completed.

The selected high melt strength material is first fed into the extruder and heated to a specified temperature (for example, 350 degrees Fahrenheit). The material is then extruded into a parison [smooth walled tube] through an appropriate extrusion die. This die can be configured in a known manner to produce a parison in the cross-sectional shape such as shown in FIG. 4. The parison is preferably though not necessarily formed in the die such that a predetermined ratio between the thickness of the outer peripheral wall and the inner partition is maintained. In the preferred embodiment, a 2:1 ratio is maintained.

After exiting the die, the molten parison is provided into the blow molding apparatus with or without vacuum assist. The outer wall of the parison is thereafter moved under positive internal pressure and/or negative vacuum forming pressure into direct contact with the corrugated pattern of a mold train. Positive tension is needed to stretch the hose after the molds so when the hose is relaxed after final cooling the corrugations in the partition wall will form.

Figure 5:
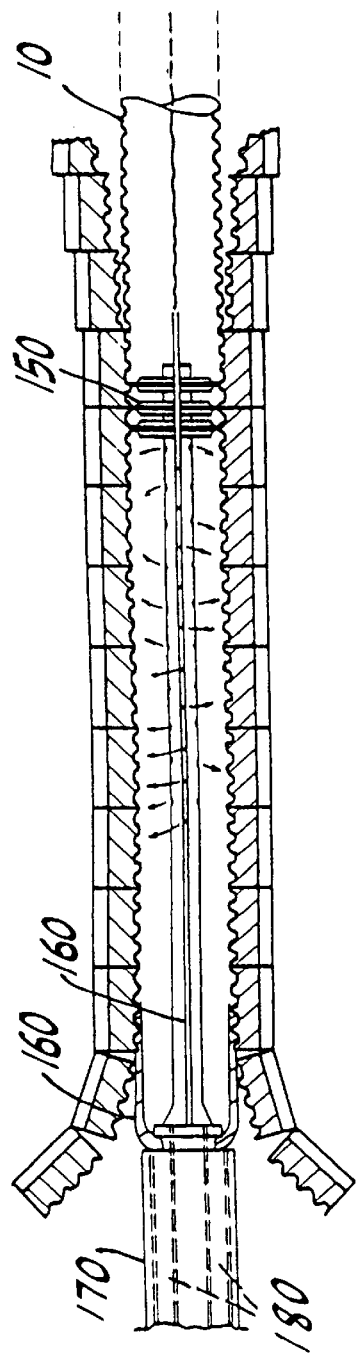
FIG. 5 is an illustration of a blow molding apparatus according to the invention.

As stated above, the molding or forming apparatus will provide either positive or negative pressure as desired through the lumens. One method, well known in the extrusion industry for providing air injection in multi-lumen hoses, involves the use of a floating plug technique and is illustrated in FIG. 5. The plugs, such as floating plug 150, may be composed, for example, of a bundle of fibers which float inside the lumens of the parison 160 after extrusion and during the molding process. The plugs are attached to the extrusion die 170 with a wire. During the molding process, the floating plugs will provide a seal for positive pressure through air inlets, such as 180, which push the parison into the corrugated molds of the mold assembly.

Figure 6:
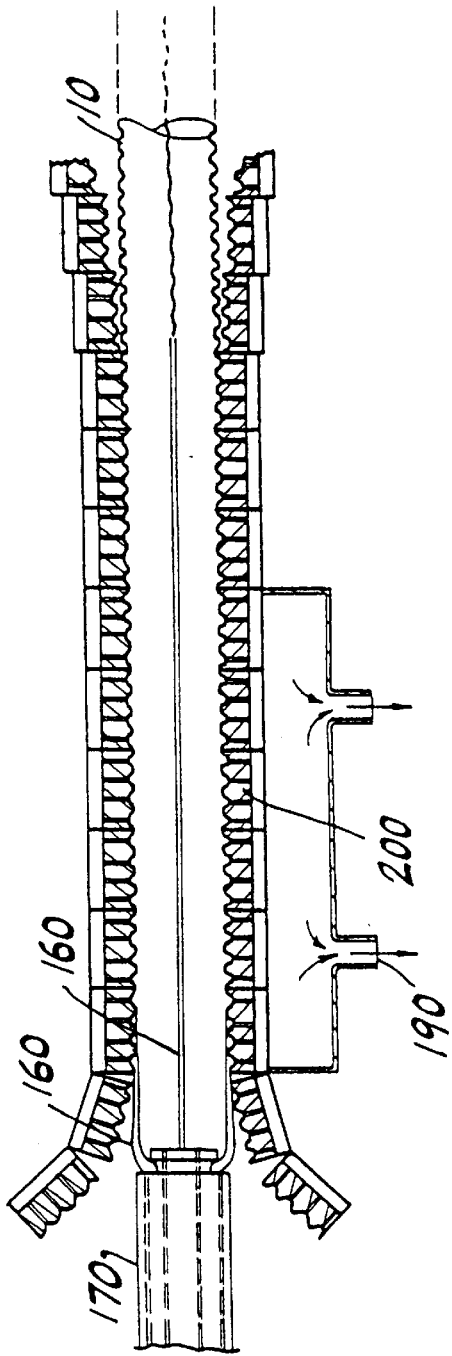
FIG. 6 is an illustration of a vacuum assisted blow molding apparatus according to the invention.

A similar vacuum assisted blow molding process is illustrated in FIG. 6, using vacuum inlets outside the molds, such as 190, and vacuum slots inside the mold, such as 200, to pull the hot parison against the corrugated molds.

Alternatively, the pinched tube process may be used, where the parison is pinched off periodically, for example, every 50 feet, and air is injected into the individual segments in lieu of the floating plug.

As shown in FIGS. 5 and 6, the mold assembly can include a set of split molds, each half having a corrugated pattern to produce the peripheral corrugated hose design. These molds provide wider corrugation patterns than the desired resulting final product. The smaller and shorter pitch corrugation patterns of the resulting product is achieved because, although the material is first placed in the mold with longer, wider ridges, the hose will shrink in length outside of the mold during the final cooling stages to attain its desired final dimensions. During this shrinkage the corrugations of the partition wall will be formed.

After extrusion and insertion into the mold assembly, the inner partition of the parison will remain flat and, due to the high melt strength of the selected material, will not collapse or come into contact with the inner surface of the peripheral walls of the hose during the blow molding operation. Additional care should be taken to avoid significant and unusual pressure imbalances between the lumens during the molding operation.

Once the material has properly attached to the mold blocks, the hose is cooled while in the molds just enough to impart the corrugated shape and prevent collapsing. The split molds are then removed and final cooling and shrinking is allowed to occur only after the internal air pressure is released.

Once outside the mold assembly, the hose will shrink into the smaller pitch final corrugation pattern. This lateral shrinkage causes the inner partition to become corrugated in the longitudinal direction. More particularly, the peripheral corrugations formed by the molds shrink and the desired corrugation of the outer hose is formed. Also, due to the nature of the selected thermoplastic material, the ratio in thickness between the outer wall and the inner partition, and the corrugation pattern of the outer wall, the partition wall will itself form a corrugated pattern as a result of the shrinkage. In other words, as the hose shrinks in length, the pitch of the outer corrugations are reduced and the inner partition, which has been stretched somewhat during the molding operation, is relaxed into a corrugated pattern. The stretching of the inner partition causes the thickness of this partition to decrease with respect to the thickness of the outer wall. Thus, the ratio of the peripheral wall thickness to partition wall thickness will increase, as described earlier. (For instance, in one embodiment, the 2:1 ratio of the extruded parison may increase to 3:1 for the final corrugated hose).

The final dimensions of the above discussed illustrative embodiment of the hose include an outer diameter of 1.64 in. with approximately 3 corrugations per inch, and the outside corrugation height being 0.16 in. Also, the hose will weigh approximately 50 grams/foot.

Alternative embodiments of the present example, where, for example, more than two internal compartments are found, should be understood to be within the scope of the present invention. Also, many different shapes, sizes and corrugation patterns of the hose can be provided.

As various changes may be made in the above construction and method of making or process for making the multiple compartment corrugated hose without departing from the scope of the invention, it is intended that all matter contained in the above description and apparatus shown in the accompanying drawings shall be interpreted as illustrative and not in a limiting sense.

We claim:

1. A method for manufacturing a multi-lumen hose, comprising the steps of:

forming a hot multi-lumen parison from a high melt strength and flexible thermoplastic material, said parison having a peripheral section with an inner surface defining a diameter and at least one flat inner partition extending from said inner surface and across at least half of the diameter of said peripheral section, said partition dividing an interior area of said parison into a plurality of lumens;

molding the peripheral section of the hot parison in a pattern mold, while maintaining said inner partition in its flat condition; and allowing said peripheral section to shrink after emerging from the pattern mold, thereby causing said inner partion to attain a patterned profile.

2. The method of claim 1, wherein said thermoplastic material is a flexible high melt strength polyolefin.

3. The method of claim 1, wherein the thickness of the peripheral section of the parison is approximately twice the thickness of the inner partition of the parison.

4. The method of claim 1, wherein the thickness of the peripheral section of the hose product is about 0.030 in., and the thickness of the inner partition is about 0.010 in.

5. The method of claim 1, wherein the pattern mold is corrugated.

6. The method of claim 1, wherein the step of forming the parison in the pattern mold is done by the blow molding process with internal air pressure.

7. The method of claim 1, wherein the step of forming the parison in the pattern mold is done by the blow molding process with vacuum assist with or without internal air assist.

8. The method of claim 1, further comprising the step of stretching the inner partition, after the step of molding the peripheral section of the hot parison in the pattern mold.

9. The method of claim 1, further comprising the step of at least partially cooling the peripheral section of the hot parison, while molding the peripheral section of the hot parison in the pattern mold.

10. A flexible multi-lumen hose having a corrugated longitudinal partition, manufactured by the steps of:

providing a high melt strength thermoplastic material;

forming a multi-lumen parison from said material, said parison having a peripheral section with an inner surface defining a diameter and at least one inner partition extending from said inner surface and across at least half of the diameter of said peripheral section, said partition dividing the interior area of said parison into a plurality of lumens;

inserting said multi-lumen parison into a corrugated pattern mold;

temporarily forming the parison into the pattern of the mold while said inner partition remains flat;

partially cooling the parison in the mold;

removing the parison from the mold; and allowing the parison to further cool and shrink outside the mold under stretch and then relaxing the stretch to allow the inner partition to achieve a corrugated configuration.

11. The hose of claim 10, wherein said hose is formed of a flexible high melt strength thermoplastic material.

12. The hose of claim 10, wherein the thickness of the peripheral wall is approximately three times that of the inner partition or other ratio in which the partition wall is less than the peripheral wall thickness.

13. The hose of claim 10, wherein said peripheral wall is formed in said mold by a blow molding process with internal air pressure.

14. The hose of claim 10, wherein said peripheral wall is formed in said mold by a blow molding process with vacuum assist.

15. A multi-lumen hose comprising:

a corrugated peripheral wall enclosing an interior area and having an inner surface which defines a diameter; and at least one corrugated inner partition extending from said inner surface and across at least half of the diameter of said peripheral wall so as to divide said interior area into a plurality of lumens, wherein said peripheral wall is temporarily formed in a patterned mold while the inner partition is maintained flat, said peripheral wall thereafter reducing in length upon cooling further outside of said mold thereby causing the inner partition to attain a patterned profile.

* * * * *